United States Patent Office 3,003,218
Patented Oct. 10, 1961

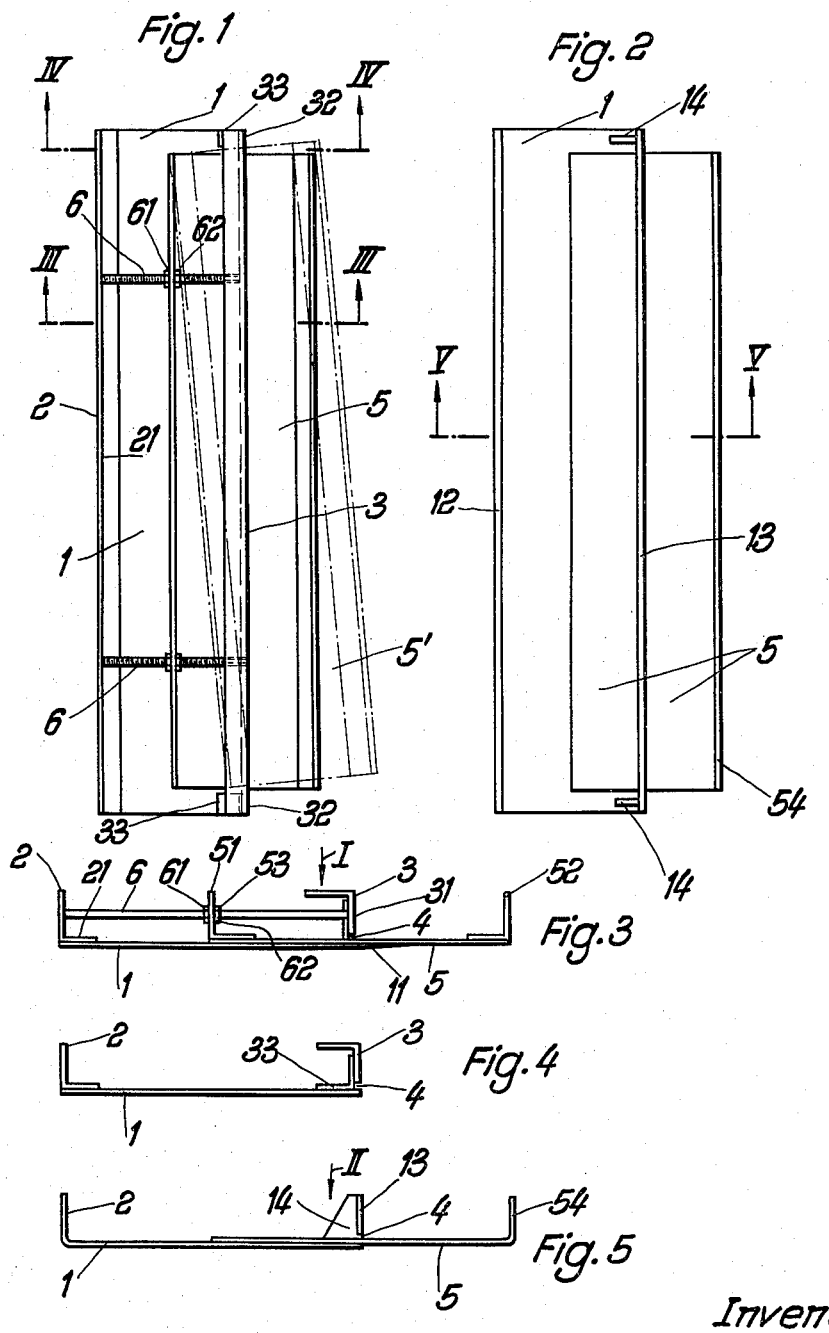

3,003,218
MOLD ELEMENT, PARTICULARLY FOR SLIDING, TRAVELLING OR CLIMBING MOLDS
Hans Dorn, Dusseldorf, Germany, assignor to Firma Acrow-Wolff Gesellschaft mit beschrankter Haftung, Dusseldorf, Germany
Filed Sept. 14, 1959, Ser. No. 839,980
Claims priority, application Germany Sept. 17, 1958
9 Claims. (Cl. 25—131)

The present invention relates to a novel mold element, preferably for sliding, travelling or climbing molds.

In the construction of modern buildings, including particularly industrial buildings, of concrete, the three-dimensional shape of some surfaces to be molded, e.g., in the construction of cooling towers of concrete, gives rise to problems which cannot be solved with the previously usual panellike mould plates, even if they were more or less flexible. This is rendered possible by the mold elements according to the invention, which are characterized in that one element comprises mold panels which are linearly movable relative to each other in a plane substantially parallel with their own planes. The element may also comprise mold panels which are substantially angularly movable relative to each other in a plane substantially parallel with their own planes. Finally the mold panels of the element may be linearly and angularly movable relative to each other. This is achieved in the simplest manner by forming a mold base panel as a guide for sliding mold panels which are linearly and/or angularly movable relative thereto. The generally required stiffeners for the mold panels may be used for this purpose. In a development of the invention a mold base panel is formed as a carrier of stiffeners, which consist preferably of ribs and at least one of which defines a slot which serves for guiding a sliding mold panel. It is not necessary to provide the slot within the stiffening rib. The rib may define the slot jointly with the adjacent boundary surface of the mold panel. This affords the advantage that the sliding mold panel is moved in direct engagement with the mold base panel so that the width of the slot corresponds only to the thickness of the sliding mold panel plus the minimum clearance required for guiding. The sliding mold panel may also be designed as a carrier of stiffeners, which consist preferably of ribs, without interfering with the relative linear and angular movements. This is achieved, e.g., in that a mold base panel carries riblike stiffeners at two opposite edges, preferably at two vertical edges, one of which stiffeners defines a slot, through which a sliding mold panel extends, which is preferably provided with riblike stiffeners disposed on both sides of the slot-defining stiffeners of the mold base panel.

Particularly advantageous constructions will be obtained when the base or sliding mold panels consist of simple sheet metal panels, e.g., of steel. In this case the mold panels can be subjected to a resilient deformation which corresponds to the three-dimensional curve and which can be subsequently removed if the elastic range has to be exceeded. This does not change the linear and/or angular movability of the base or sliding mold panels relative to each other if both panels are given approximately equal radii of curvature. The riblike stiffeners consist in this case suitably of rolled sections, which are connected to the sheet metal panels in any desired manner, e.g., by welding or riveting. The sections which may be used are not restricted to flat bars and angles but the stiffeners may consist of tubular sections. If it is desired to omit sections to be joined to the sheet metal panels, flanges of the base or sliding mold panels themselves may form the necessary stiffeners, which may also have the shape of a bead.

If the length of the guide slots of a mold base panel for a sliding mold panel equals the length of the diagonal of the sliding mold panel thus guided, the sliding mold panel can be angularly moved relative to the mold base panel through any desired angle because it is sufficient if the length of the mold base panel exceeds the length of the slots to such an extent that the resulting webs between the mold base panel and the stiffeners have the necessary minimum strength.

In this case it is desirable to provide that edge portion of a mold base panel which faces a sliding mold panel with a thickness which tapers to a minimum at the edge itself so that the mold base panel will not mold the concrete surface and the mold elements according to the invention may also be used for molding exposed concrete. Finally, adjusting and locking means may be arranged between base and sliding mold panels to adjust them to and retain them in their relative position. This may be effected most simply in that the adjusting and locking means consist of screw-threaded rods which are preferably held in the stiffeners of a mold base panel and extend through openings in the stiffener of the sliding mold panel disposed between the stiffeners of the mold base panel and carry nuts on both sides of stiffener of the sliding mold panel. In this case it is sufficient to rotate the nut, which forms an abutment, in order to enable the sliding mold panel to be applied to the adjustable abutment thus provided in a predetermined position relative to the mold base panel whereas the second nut can be rotated to form a lock nut for retaining the sliding mold panel in the adjusted position relative to the mold base panel. In order to avoid a constraint in spite of the pivotal movability of the sliding mold panel relative to the mold base panel the openings in the stiffeners of the sliding mold panel will be suitably somewhat larger than the outside diameter of the screw-threaded rods and will be formed as slots extending in the longitudinal direction at right angles to the plane of the mold panel or to a plane which is tangential to a curved surface of the mold panel where it is adjoined by the stiffener. In the case of particularly strong inclinations between the stiffeners and the nuts, shaped elements may be provided, e.g., in the form of guide sleeves cut at an angle to their longitudinal axis.

The adjusting and fixing means may be of different shape. For instance, they may consist of racks carried by the stiffeners of the mold base panel and in mesh with pinions disposed in the stiffener of the sliding mold panel disposed between the stiffeners of the mold base panel, locking pawls or similar locking devices being provided to hold the pinions in their adjusted position.

The drawing shows illustrative embodiments of the invention.

FIG. 1 is a top plan view showing a mold base panel which is provided with a sliding mold panel, seen in the direction of the arrow I of FIG. 3. The scale of FIG. 1 is somewhat smaller than that of FIG. 3.

FIG. 2 is a top plan view taken in the direction of the arrow II of FIG. 5 on the embodiment shown therein, which is simplified compared to FIGS. 1 and 3.

FIG. 3 shows a horizontal transverse sectional view taken on line III—III of FIG. 1 through the mold element according to FIGS. 1 and 3.

FIG. 4 shows the mold base panel of FIG. 3 in a transverse sectional view taken on line IV—IV of FIG. 1 in order to give a better impression of its design.

FIG. 5 shows the above-mentioned embodiment of a mold element which is simplified compared to that of FIGS. 1, 3 and 4, in a horizontal transverse sectional view taken on line V—V of FIG. 2.

As is apparent from FIGS. 1 and 3, a mold base panel is provided in the form of a sheet steel panel 1. As is apparent from FIG. 1 the sheet steel panel 1 has the form of an upright narrow rectangle. The steel plate 1 is stiffened at 2 and 3 by angle sections attached thereto. Whereas the flange 21 of the angle section 2 facing the adjacent surface of the steel sheet 1 adjoins the mold base panel throughout the area of this flange and is joined thereto, e.g., by spot welds distributed throughout this surface, the flange 31 of the angle section 3 is somewhat set back relative to the boundary surface of the mold base panel 1 facing it so that a slot 4 is formed, through which the sliding mold panel 5 extends. Only at the points 32 can the flange 31 of the angle section 3 extend into contact with the facing boundary surface of the mold base panel and be firmly connected at these points to the mold base panel 1 so that the sliding mold panel 5 will be firmly guided in the slot 4. Such a design of the angle section 3 selected as a stiffener, however, would necessitate a corresponding aperture in the flange 31 of the angle section 3 to form the slot 4. This would require special machining operations. In order to eliminate this requirement a different design is chosen. The length of the angle section 3 is equal to the length of the long edge of the sheet steel panel 1. As is particularly apparent from FIG. 4 this panel carries at the points 32 short angle brackets 33, to which the angle section 3 is welded in such a manner that the offsetting of the angle section 3 relative to the angle brackets 33 apparent from FIG. 4 results in the formation of the slot at 4. The width of the slot corresponds to the thickness of the sliding mold panel 5 plus the minimum guiding clearance required. The sliding mold panel 5 is stiffened by the angle sections 51 and 52 attached thereto. The height of the slot 4, considered in the direction of the long edge of FIG. 1, corresponds to a diagonal through two opposite corners of the sliding mold panel 5 so that the base and sliding mold panels 1, 5 cannot only be linearly displaced but can be angularly moved relative to each other through any desired angle. As the sheets 1 and 5 are thin, the mold element can thus be given various three-dimensioned shapes and curvatures. Parallel trapezoid shoes are particularly desirable because they can be used, possibly in conjunction with an appropriate curvature, to form together with mold carriers or the so-called main formwork which supports the mold elements a formwork with which concrete parts of any desired shape, which are defined by three-dimensional curves, may be molded.

To enable the base and sliding mold panels 1 and 5 of the mold element to be adjusted to and locked in specific positions, the following further measures are taken in the illustrative embodiment of FIGS. 1 and 3.

The stiffeners 2 and 3 which consist of angle sections but may also consist of attached flat bars, tubes or other suitable sections, carry the screw-threaded rods 6, which extend through openings 53 in the stiffener 51 of the sliding mold panel 5. The nuts 61 and 62 are provided on the screw-threaded rod 6 on both sides of the stiffener 51 and provide abutment and lock nuts to determine and retain the position of the stiffener 51 disposed between them, and thus of the sliding mold panel 5. If the sliding mold panel 5 is to be moved into the position 5' indicated with dash lines in FIG. 1 it is sufficient to move the nuts 61 and 62 on the upper and lower screw-threaded rods 6 toward the right until the sliding mold panel 5 is in the position 5' indicated with dash lines.

FIG. 3 shows that the mold base panel 1 is formed at that edge portion 11 which faces the sliding mold panel 5 with a thickness which tapers to a minimum at the edge itself. As a result, this edge is not molded in the concrete contacting the panels 1, 5.

FIGS. 2 and 5 show a simplified embodiment of the mold element, in which the riblike stiffeners 12 of the mold base panel 1 and 54 of the sliding mold panel 5 do not consist of sections but of flanges of the respective mold panels. The guide formed in the mold base panel 1 for the stiffener 13 consists of a flat bar, which is held by the flat angle brackets 14 in a position in which the guide slot 4 for the sliding mold panel 5 is defined.

It is in the nature of the invention that the mold element may differ in various ways from the illustrative embodiments without departing from the spirit of the invention.

I claim:

1. A mold element for sliding, travelling, climbing and like molds, said element comprising, in combination, a first and a second rectangular mold panel, each of said panels having two parallel longitudinal edges and at least one of said panels consisting of an elastically deformable material; a first stiffening member connected to and extending along one edge of said first panel; a second stiffening member connected to, located within the confines of and extending along the other edge of said first panel, said second stiffening member and said first panel defining therebetween an elongated slot for slidably receiving the second panel in such manner that one edge of said second panel is located between said first and second stiffening members whereby said second panel is linearly movable with respect to said first panel in directions substantially perpendicular to said stiffening members in a plane parallel with the plane of said first panel and is freely deflectable from said plane beyond the confines of said first panel, the length of said slot exceeding the length of said one edge of said second panel whereby said second panel is angularly movable with respect to said first panel in said plane; a third stiffening member connected to and extending along said one edge of the second panel between said first and second stiffening members, said third stiffening member formed with a plurality of openings; a threaded rod for each of said openings, each rod connected with and substantially perpendicular to said first and second stiffening members, said rods extending through the respective openings of said third stiffening member with sufficient play to permit angular movement of said second panel with respect to said first panel; and a nut mounted on each of said rods at each side of said third stiffening member for locating said rods with respect to said third stiffening member and for thereby holding said second panel in a fixed position with respect to said first panel.

2. The mold element as set forth in claim 1, wherein said openings are of elongated shape and extend in a direction perpendicular to the longitudinal direction of said third stiffening member.

3. A mold element comprising, in combination, two mold panels at least one of which consists of an elastically deformable material; and connecting means securing said panels to each other for linear and angular displacement with respect to each other in a substantially common plane, said connecting means located entirely within the confines of the other of said panels whereby said one panel which consists of elastically deformable material may be freely deflected relative to said other panel beyond the confines of said other panel.

4. A mold element for sliding, travelling, climbing and like molds, said element comprising, in combination, a pair of substantially rectangular mold panels each having two parallel edges and at least one panel thereof consisting of an elastically deformable material; and connecting means securing said panels to each other for linear and angular displacement with respect to each other in a substantially common plane, said connecting means provided on and located entirely within the confines of the other of said panels and defining elongated slot means substantially parallel with the edges of said other panel for slidably guiding said one panel in said plane, said one panel freely deflectable from said plane beyond the confines of said other panel and the length of said slot means at least slightly exceeding the length of the edges of said one panel.

5. A mold element as set forth in claim 4, further comprising at least one stiffening member for each of said panels, the stiffening members rigid with and substantially parallel with the edges of the respective panels.

6. A mold element as set forth in claim 5, wherein each of said panels consists of elastically deformable material and wherein the length of said stiffening members approximates the length of the edges of the respective panels.

7. A mold element as set forth in claim 4, wherein said connecting means is an elongated stiffening member having ends fixed to and extending adjacent to one edge of said other panel.

8. A mold element as set forth in claim 7, further comprising a second elongated stiffening member rigid with and extending adjacent to the other edge of said other panel, and a third stiffening member rigid with and extending adajcent to one edge of said one panel.

9. A mold element as set forth in claim 8, wherein said third stiffening member is located between said second stiffening member and said connecting means.

References Cited in the file of this patent

UNITED STATES PATENTS

| | | |
|---|---|---|
| 655,426 | Waite | Aug. 7, 1900 |
| 1,948,931 | Mears | Feb. 27, 1934 |
| 2,306,722 | Fox | Dec. 29, 1942 |
| 2,374,300 | Oldreive | Apr. 24, 1945 |
| 2,863,207 | Davis et al. | Dec. 9, 1958 |